US007872584B2

(12) United States Patent
Chen

(10) Patent No.: US 7,872,584 B2
(45) Date of Patent: Jan. 18, 2011

(54) ANALYZING SMOKE OR OTHER EMISSIONS WITH PATTERN RECOGNITION

(75) Inventor: Yu-Gene T. Chen, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 466 days.

(21) Appl. No.: 11/784,636

(22) Filed: Apr. 9, 2007

(65) Prior Publication Data

US 2008/0246622 A1    Oct. 9, 2008

(51) Int. Cl.
*G08B 17/10* (2006.01)
*G08B 21/00* (2006.01)
*G08B 17/12* (2006.01)
*G06K 9/00* (2006.01)
*G01N 21/00* (2006.01)

(52) U.S. Cl. .................. 340/628; 340/605; 340/578; 382/100; 356/438

(58) Field of Classification Search .............. 340/628, 340/605; 382/100; 356/438
See application file for complete search history.

(56) References Cited

U.S. PATENT DOCUMENTS

| 3,841,763 | A | * | 10/1974 | Lewis | 356/438 |
| 4,614,968 | A | * | 9/1986 | Rattman et al. | 348/143 |
| 5,153,722 | A | | 10/1992 | Goedeke et al. | |
| 6,025,920 | A | * | 2/2000 | Dec | 356/438 |
| 6,335,976 | B1 | * | 1/2002 | Belmares | 382/103 |
| 6,597,799 | B1 | | 7/2003 | Pfaff et al. | |
| 6,937,743 | B2 | * | 8/2005 | Rizzotti et al. | 382/100 |
| 7,002,478 | B2 | * | 2/2006 | Moore et al. | 340/577 |
| 7,495,767 | B2 | * | 2/2009 | Kim et al. | 356/438 |
| 2003/0141980 | A1 | * | 7/2003 | Moore et al. | 340/578 |
| 2006/0188113 | A1 | | 8/2006 | Tice et al. | |
| 2006/0220888 | A1 | | 10/2006 | Germouni et al. | |
| 2007/0247629 | A1 | * | 10/2007 | Kim et al. | 356/438 |

FOREIGN PATENT DOCUMENTS

EP         0687594 A1   12/1995
WO    WO 00/23959 A1    4/2000

* cited by examiner

*Primary Examiner*—George A Bugg
*Assistant Examiner*—Jack Wang
(74) *Attorney, Agent, or Firm*—Munck Carter, LLP

(57) ABSTRACT

A system and method for analyzing smoke or other emissions are provided. An image is analyzed and processed to identify characteristics associated with the emission, such as color, densities, dispersion rates, fuel mixture characteristics, and other suitable analysis factors. If the analysis indicates that abnormal conditions exist or that any user-defined alerts are warranted, a message is sent to an operator terminal. The system and method may continue to capture subsequent images and thus provide real-time data. The data may be stored in memory and collected over time. The data may be associated with a digital signature and used to create reports for company quality control boards, regulatory control agencies, and the public. The system and method thus provide a cost effective, reliable, and repeatable mechanism for real-time analysis of smoke stacks and other environmental changes.

20 Claims, 2 Drawing Sheets

ANALYZING SMOKE OR OTHER EMISSIONS WITH PATTERN RECOGNITION

TECHNICAL FIELD

This disclosure relates generally to environmental analysis techniques and more specifically to digital analysis of smoke or other emissions.

BACKGROUND

Conventional systems and methods for analyzing smoke or other emissions from equipment such as gas turbines, boilers, and other machines or processes often fail to offer efficient, cost-effective solutions. Typically, any comprehensive assessments of these emissions occur only during the initial installation of the equipment.

In some instances, conventional practices often require close monitoring and visual or manual assessments of emissions. Accordingly, conventional practices tend to be relatively time consuming and often yield inconsistent results. Also, emissions testing is typically performed by personnel who require special training.

For these or other reasons, conventional emissions testing systems and methods often fail to produce accurate and repeatable interpretations of emissions. In addition, conventional emissions testing systems and methods often fail to accurately assess high-level fuel mixtures (i.e., to determine rich versus lean mixtures) and evaluate any potential environmental impacts.

SUMMARY

This disclosure provides a smoke emissions analysis system and method.

In a first embodiment, a system includes a memory operable to store an image, where the image is associated with an environmental change. The system also includes a processing module operable to process the image to identify one or more characteristics associated with the environmental change.

In particular embodiments, the environmental change may include a smoke emission, a chemical release, or a hazardous condition.

In other particular environments, the one or more characteristics may include a color characteristic, a density rate, a dispersion rate, and an emission level.

In a second embodiment, a method includes correlating data associated with an image of an emission with a desired emission characteristic associated with the emission. The method also includes storing emission data associated with the correlated data.

In a third embodiment, a computer program is embodied on a computer readable medium. The computer program includes computer readable program code for correlating data associated with an image of an emission with a desired emission characteristic associated with the emission. The computer program also includes computer readable program code for storing emission data associated with the correlated data.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
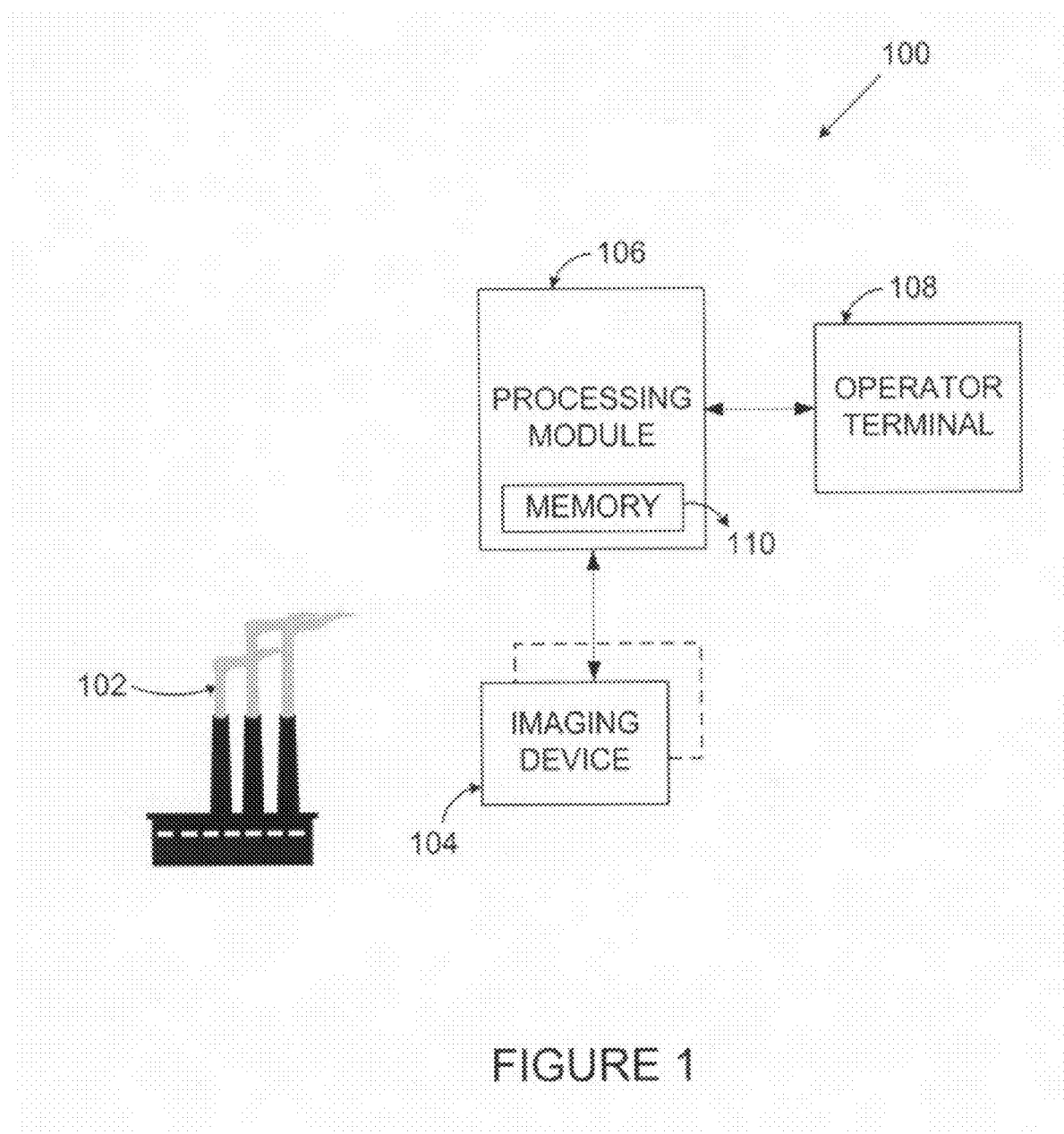
FIG. 1 illustrates an example emissions analysis system.

FIG. 1 illustrates an example emissions analysis system 100. The embodiment of the system 100 shown in FIG. 1 is for illustration only and is not drawn to scale. Other embodiments of the system 100 may be used without departing from the scope of this disclosure. Also, the system 100 may be used in any suitable application, such as to monitor and detect one or more smoke stacks, smoke emissions, chemical releases, environmental changes, hazardous conditions, or any other suitable conditions. Although shown in FIG. 1 and described as analyzing a smoke emission 102, the system 100 of FIG. 1 could be used to analyze any other suitable type of emission.

The system 100 uses one or more digital images, sets of images, or video streams to analyze the smoke emissions 102. The digital images, sets of images, or video streams (sometimes collectively referred to as "images") may be captured with any suitable imaging device 104. The system 100 could include one or multiple image devices 104. The imaging device 104 could, for example, include a camera, video camera, analog-to-digital video converter, or image processor.

The imaging device 104 could be sufficient to analyze an emission (e.g., analyzing smoke plume for color and volume) when the emission is symmetric (e.g., a symmetric smoke plume). Two or more of the imaging devices 104 could be used to characterize density and dispersion rate of the smoke plume.

The images captured by the imaging device 104 are analyzed in a processing module 106. The images may be transferred directly from the imaging device 104 to the processing module 106 by a wireline or a wireless connection. The images could also be stored on a storage medium, such as a disk or removable memory device, and then transferred to the processing module 106.

The processing module 106 may represent any suitable hardware, software, firmware, or combination thereof (such as a processor, controller, or computer program) capable of analyzing images. The processing module 106 may be external to the imaging device 104 as shown in FIG. 1 or may be part of the imaging device 104. The analysis performed by the processing module 106 may include identifying and/or recognizing characteristics, variables, or patterns associated with emissions, such as color characteristics, density, and dispersion rates that can be used to determine emission levels and to provide guidance in determining certain fuel mixtures.

The processing module 106 could include an analysis algorithm employing static comparisons or dynamic learning model comparisons. In one example, the analysis algorithm could include mapping to a known database for relatively simple systems using similar equipment and monitored under relatively identical environmental conditions. In another example, the algorithm could include dynamic learning algorithms where the processing module 106 could use both a known database as well as any new information learned under dynamic analysis of the current equipment being monitored. In other examples, the analysis algorithm could also use key framing techniques to map image frames into key properties and matching these properties against the master (known database).

In other examples, the processing module 106 could use an analysis algorithm using machine learning (or dynamic modeling with learning algorithms). Such algorithms increase the robustness of the analysis using different equipment versus using just a static master database. The machine learning technique is best suited for implementations where the emission being monitored changes based on set-up or configuration of the equipment (e.g., a test stand at a factory where different turbine models are tested or in cases where equipment configuration changes are made to produce different batches but where exhaust channels stay the same).

The processing module 106 could also use algorithms employing machine learning techniques. Such techniques could account for environmental changes as well as any process or equipment setup changes by accounting for these changes over time and/or could include the history based reset. By allowing the history base to be reset, the processing module 106 could monitor new or different equipment at the same location (e.g., in a gas turbine test stand). In addition, machine learning prevents different equipment configurations to influence the analysis of current configurations. For example, there could be four different types of equipment being analyzed with distinctly different characteristics: a two cycle motor (A), a 4 cylinder engine (B), a turbine engine (C), and a Rankin engine (D). A test facility could be set up to conduct a series of 10 tests (e.g., A, A, A, D, B, B, B, C, C, C). The processing module 106 could be set to recognize the distinct characteristic differences and reset the history or the end-user could reset the history between each equipment type change (e.g., changing from engine A to engine D).

The processing module 106 could employ any of the above-described analysis algorithms either alone, in combination with each other, or in combination with other suitable analysis algorithms. After correlating and processing the image data with emission characteristics, the processing module 106 monitors whether any abnormal conditions exist or any user-defined alerts are warranted. If any abnormal condition exists or user-defined alerts are warranted, the processing module 106 sends the pertinent message or alert to an operator terminal 108.

The operator terminal 108 may represent any suitable terminal, monitor, or apparatus suitable for monitoring or displaying the results of the system 100. The operator terminal may be located external to the imaging device 104 and the processing module 106 as shown in FIG. 1 or may be a part of the imaging device 104, the processing module 106, or both.

After sending a pertinent message or alert, the processing module 106 may continue to capture other images using the imaging device 104. Optionally, an operator using the operator terminal 108 can request certain data or data reports from the processing module 106. For example, the operator using the operator terminal 108 may request that a certain emissions characteristic be monitored over a period of time. The requested data, in turn, may be displayed in graphical, tabular, or other suitable form to the operator terminal 108 for the operator's review. Thus, the system 100 may continuously analyze abnormal conditions and provide real-time data.

In addition, the data used, collected, or generated by the processing module 106 (such as the captured images and analysis results) may be stored in a memory 110. The memory 110 may be part of the processing module 106 as shown in FIG. 1 or may be located external to the processing module 106. A digital signature may be associated with the data for later use, such as for reporting to company quality control boards, regulatory control agencies, and the public. The digital signature may be used as an authentication mechanism to, for example, certify that the data is pristine and free of any manipulation. The stored data may also be analyzed over time to produce comprehensive smoke emissions reports showing, for example, how greenhouse emissions and other pollutants have been improved or have deteriorated.

Data used, correlated, or generated in the processing module 106 may also be stored in order to conduct comparisons with other plant processes. In addition, the data may be used to alert the local plant or a nearby community of certain hazardous chemical releases or other potentially hazardous conditions. Such warnings may be made available using standard data formats for use by local communities, neighborhood watch groups, government agencies, publicly accessed alert systems, media, and historians.

Accordingly, the system 100 provides a cost effective, reliable, and repeatable technique for real-time analysis of smoke or other emissions. Other embodiments of the system 100 may be used without departing from the scope of this disclosure. For example, the system 100 may be implemented as part of or in conjunction with a controller or other existing monitoring system. As another example, the system 100 may be implemented as part of a computer program embodied on a computer readable medium and capable of being executed by a processor.

Figure 2:
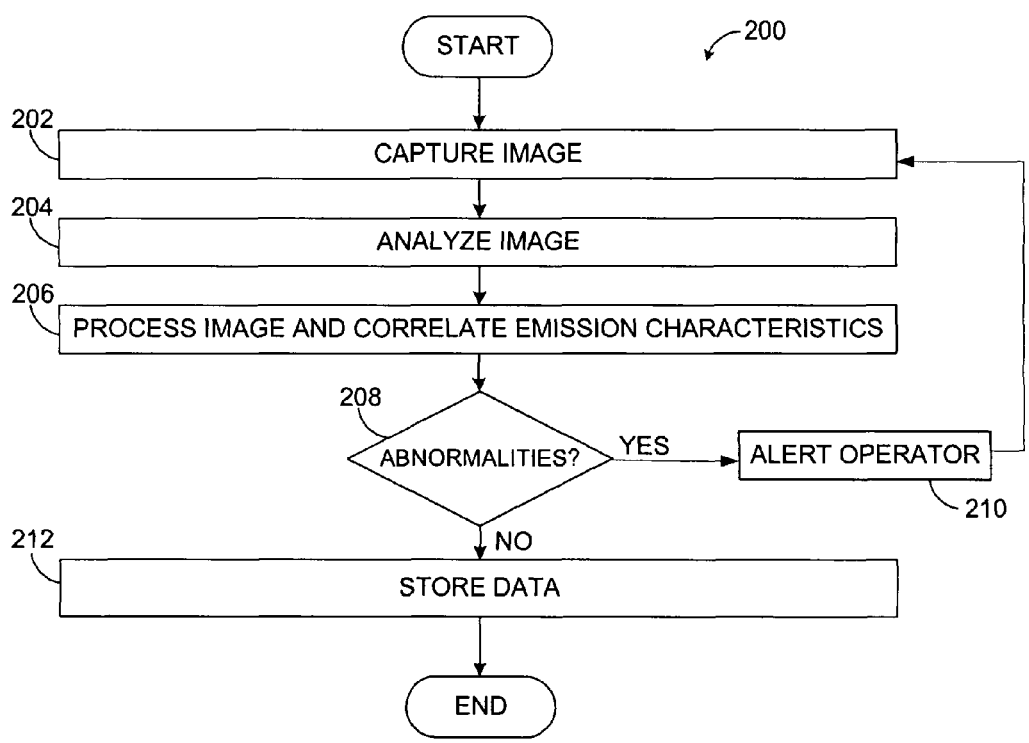
FIG. 2 illustrates an example method for analyzing emissions.

FIG. 2 illustrates an example method 200 for analyzing emissions. For ease of explanation, the method 200 is described as being used in conjunction with the system 100 of FIG. 1. The method 200, however, may be used with any other suitable system. Also, other embodiments of the method 200 may be used without departing from the scope of this disclosure.

A digital image, series of images, or video stream of an emission, such as a smoke stack, is captured at step 202. This could include capturing the images with, for example, the imaging device 104. At step 204, the image, series of images, video stream, or a subset of the images captured are analyzed at step 204. This could include, for example, using the processing module 106. As particular examples, the analysis in step 204 may include detecting color, densities, dispersion rates, fuel mixture characteristics, and other suitable analysis factors. The collected data and emission characteristic(s) are processed and correlated with a desired emission characteristic or set of characteristics at step 206.

At this point, a determination is made as to whether any abnormal conditions or any user-defined alerts are warranted at step 208. If any abnormal condition exists or a user-defined alert is indeed warranted, a pertinent message or alert is sent to a user at step 210. The method 200 then returns to step 202 to capture and analyze other images. Thus, the method 200 can continuously analyze an abnormal condition by analyzing a new image, set of images, or video stream and provide real-time data accordingly.

Otherwise, if no abnormal condition exists or alert is warranted at step 208, various data can be stored at step 212. This could include, for example, storing the data collected in step 202, the analysis results from step 204, and/or the correlated data and desired emission characteristic(s) found in step 206. The data may be stored with a digital signature for later use, such as reporting to company quality control boards, regulatory control agencies, and the public. At this point, the method 200 could end or return to step 202.

Accordingly, the method 200 provides a cost effective, reliable, and repeatable method for real-time analysis of smoke stacks. Other embodiments of the method 200 may be used without departing from the scope of this disclosure. For example, the method 200 may be implemented as part of or in conjunction with a controller or other existing monitoring systems. As another example, the method 200 may be implemented as part of a computer program embodied on a computer readable medium and capable of being executed by a processor.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
  a memory operable to store an image, the image associated with an environmental change; and
  a processing module operable to:
    process the image using a machine learning algorithm, the algorithm operable to account for differences between the image and one or more previous images, the differences resulting from a change in a configuration of equipment producing the environmental change;
    identify in the image one or more characteristics associated with the environmental change that do not result from the change in equipment configuration; and
    disregard in the image one or more other characteristics associated with the environmental change that result from the change in equipment configuration.

2. The system of claim 1, wherein the environmental change comprises at least one of: a smoke emission, a chemical release, and a hazardous condition.

3. The system of claim 1, wherein the one or more characteristics comprise a dispersion rate of a smoke emission.

4. The system of claim 1, wherein the one or more characteristics comprise an emission level.

5. The system of claim 1, wherein the image comprises video images.

6. The system of claim 1, further comprising at least one camera operable to capture the image.

7. The system of claim 1, wherein the processing module is further operable to store the one or more characteristics in the memory along with authentication information.

8. The system of claim 1, wherein the processing module is further operable to output a warning message to an operator terminal when the environmental change is an abnormal condition.

9. The system of claim 1, wherein the processing module is operable to output a message to an operator terminal when the environmental change exceeds a user-defined level.

10. A method comprising:
  processing an image of an emission using a machine learning algorithm, the algorithm operable to account for differences between the image and one or more previous images, the differences resulting from a change in a configuration of equipment producing the emission;
  identifying in the image one or more characteristics associated with the emission that do not result from the change in equipment configuration;
  disregarding in the image one or more other characteristics associated with the emission that result from the change in equipment configuration;
  correlating data associated with the image with a desired emission characteristic associated with the emission; and
  storing emission data associated with the correlated data.

11. The method of Claim. 10, wherein the correlating occurs in real-time.

12. The method of claim 10, wherein the desired emission characteristic comprises a dispersion rate of a smoke emission.

13. The method of claim 10, wherein the desired emission characteristic comprises an emission level.

14. The method of claim 10, wherein the image comprises digital video images.

15. The method of claim 10, further comprising analyzing the image to determine the data associated with the image of the emission.

16. The method of claim 10, further comprising outputting a warning message to an operator terminal when an abnormal condition exists.

17. The method of claim 10, further comprising outputting a message to an operator terminal when a user-defined level is exceeded.

18. A non-transitory computer readable medium embodying a computer program, the computer program comprising computer readable program code for:
  processing an image of an emission using a machine learning algorithm, the algorithm operable to account for differences between the image and one or more previous images, the differences resulting from a change in a configuration of equipment producing the emission;
  identifying in the image one or more characteristics associated with the emission that do not result from the change in equipment configuration;

disregarding in the image one or more other characteristics associated with the emission that result from the change in equipment configuration;

correlating data associated with the image with a desired emission characteristic associated with the emission; and storing emission data associated with the correlated data.

19. The non-transitory computer readable medium of claim 18, further comprising outputting a warning message when an abnormal condition exists.

20. The non-transitory computer readable medium of claim 18, further comprising outputting a warning message when a user-defined level is exceeded.

* * * * *